United States Patent [19]

Coe et al.

[11] Patent Number: 4,812,855

[45] Date of Patent: Mar. 14, 1989

[54] DIPOLE ANTENNA WITH PARASITIC ELEMENTS

[75] Inventors: Richard J. Coe, Auburn; Margaret S. Morse, Renton, both of Wash.

[73] Assignee: The Boeing Company, Seattle, Wash.

[21] Appl. No.: 781,976

[22] Filed: Sep. 30, 1985

[51] Int. Cl.[4] .............................................. H01G 19/10

[52] U.S. Cl. .............................. 343/818; 343/700 MS; 343/813; 343/815; 343/817

[58] Field of Search ............... 343/818, 795, 797, 810, 343/815, 819, 820, 813, 817, 812, 700 MS File

[56] References Cited

U.S. PATENT DOCUMENTS

| | | | |
|---|---|---|---|
| 2,208,413 | 7/1940 | Erben | 343/819 X |
| 2,897,497 | 7/1959 | Finneburgh, Jr. | 343/819 |
| 3,191,177 | 6/1965 | Parzen | 343/818 X |
| 3,302,208 | 3/1965 | Hendrickson | 343/787 |
| 3,509,575 | 5/1968 | Kawamoto | 343/795 |
| 3,541,559 | 11/1970 | Evans | 343/795 X |
| 3,623,109 | 11/1971 | Neumann | 343/815 X |
| 4,089,003 | 5/1978 | Conroy | 343/700 MS |
| 4,118,706 | 10/1978 | Kerr | 343/700 MS |
| 4,290,071 | 9/1981 | Fenwick | 343/815 X |
| 4,370,657 | 1/1983 | Kaloi | 343/700 MS |
| 4,401,988 | 8/1983 | Kaloi | 343/700 MS |
| 4,604,628 | 8/1986 | Cox | 343/818 |

FOREIGN PATENT DOCUMENTS

| | | | |
|---|---|---|---|
| 213178 | 7/1955 | Australia . | |
| 0007706 | 6/1984 | Japan | 343/700 MS |

OTHER PUBLICATIONS

Johnson et al., "Single-Channel Yagi-Uda Dipole Array Antennas", Antenna Engineering Handbook, 1984, pp. 29-17, 29-18, 29-19.

"Parasitic Arrays", The A.R.R.L. Antenna Book, Ch. 6, pp. 6-17 to 6-19, published by the American Radio Relay League, Inc., Newington, Conn., 1983.

*Primary Examiner*—Eugene R. LaRoche
*Assistant Examiner*—Seung Ham
*Attorney, Agent, or Firm*—Finnegan, Henderson Farabow, Garrett and Dunner

[57] ABSTRACT

A dipole antenna system includes a driven dipole element and two parallel parasitic dipole elements equally spaced from the driven dipole element. Dual polarization can also be achieved by using two such systems arranged orthogonally.

20 Claims, 3 Drawing Sheets

CALCULATED INPUT IMPEDANCE

MEASURED INPUT IMPEDANCE

DIPOLE ANTENNA WITH PARASITIC ELEMENTS

BACKGROUND OF THE INVENTION

The present invention relates to the field of dipole antenna elements and especially to the use of such antenna elements in arrays for aerospace applications.

Antennas are required for many aerospace applications, such as in electronically scanned arrays for radar or communication systems on aircraft or satellites, and in tracking, telemetry, or seeker antennas for missiles. The radiating elements used in such applications must conform to the surface of the vehicle carrying the antennas and must be both lightweight and capable of being manufactured relatively inexpensively and accurately using printed circuit technology.

Modern surveillance radars also require wide signal bandwidth for scanning. The pattern beamwidth appropriate for wide angle scanning may also require dual orthogonal senses of polarization. Some commonly-used printed circuit elements for conformal array applications include a microstrip patch, a printed circuit dipole and stripline-fed cavity-backed slots. These elements usually have a narrow bandwidth, typically around three percent (3%), which limits their utility. Other commonly used radiating apertures for antenna arrays consist of metallic rectangular or circular waveguides or cavities. These elements, however, are expensive to manufacture and are prohibitively heavy for airborne applications.

OBJECTS AND SUMMARY OF THE INVENTION

One object of this invention is a dipole antenna system that can be used in an array that conforms to the surface of an airborne vehicle.

Another object of this invention is a dipole antenna system which can be used in a lightweight and relatively inexpensively manufactured antenna array.

Yet another object of this invention is a dipole antenna system which can be manufactured with printed circuit technology relatively inexpensively and accurately.

Additional objects and advantages of this invention will be set forth in the following description of the invention or will be obvious either from that description or from the practice of that invention.

The objects and advantages of this invention may be realized and obtained by the appratus pointed out in the appended claims. The dipole antenna system overcomes the problems of the prior art and achieves the objects listed above because it is amenable to printed circuit design and manufacture, has dimensions and patterns suitable for phased arrays with wide angle scan requirements, and has a wide frequency bandwidth, typically about forty percent (40%). The dipole antenna system of this invention can also be constructed in either a single or dual orthogonal sense linear polarization configuration.

Specifically, to achieve the objects and in accordance with the purpose of this invention, as embodied and broadly described, the dipole antenna system of this invention is coupled to a source of excitation signals and comprises a driven dipole element electrically connected to the source of excitation signals, and two parasitic strip dipole elements aligned in parallel with the driven dipole element, each strip dipole element being located a predetermined distance from the driven dipole, whereby the parasitic strip dipoles are electromagnetically coupled to the driven dipole to expand the bandwidth of the antenna system over that provided by the driven dipole element alone.

The dipole antenna system of this invention may also have a reflecting ground plane located parallel to the driven and parasitic dipole elements, and that ground plane, as well as the dipole elements, may be printed circuit elements on a dielectric printed circuit board. In addition, the dipole antenna system of this invention can include two driven dipole elements and two pairs of parasitic strip dipole elements arranged to provide a dual orthogonal linear polarization configuration. The dipole antenna system of the invention may also be components of an antenna array.

The accompanying drawings, which are incorporated in and constitute a part of the specification, illustrate an embodiment of this invention and, together with the description, explain the principles of the invention.

DESCRIPTION OF THE PREFERRED EMBODIMENTS

Reference will now made in detail to the preferred embodiments of this invention which are illustrated in the accompanying drawings.

Figure 1:
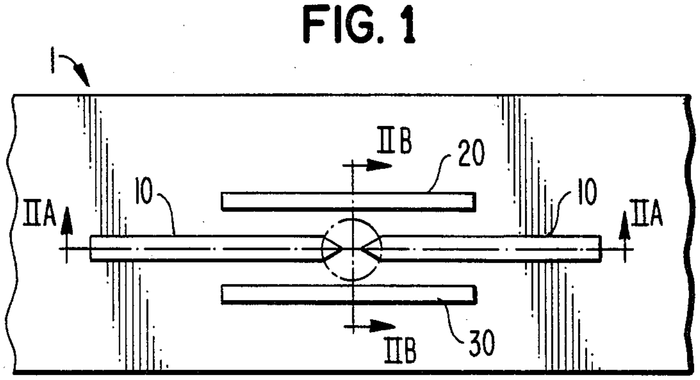
FIG. 1 is a top view of an antenna element of this invention providing a single linear sense polarization.
Figure 2A:
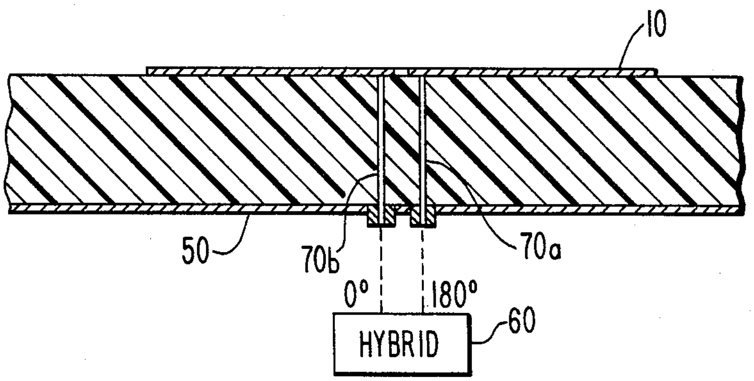
FIGS. 2A and 2B are cross-sectional views of the antenna system shown in FIG. 1 taken at lines IIA—IIA and IIB—IIB, respectively.
Figure 2B:
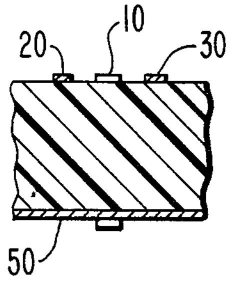

A single sense linear polarization antenna system 1 is shown in FIG. 1 by a top view and in FIGS. 2A and 2B by cross sections taken at lines IIA—IIA and IIB—IIB, respectively. The view are one of antenna element, with the understanding that such elements can be used in an antenna array, for example a phased array, comprising several such elements.

In antenna system 1, driven dipole element 10 is electrically connected to a source of excitation signals 60 shown schematically in FIG. 2A as a 180° hybrid element which may be constructed from a stripline. Dipole antenna system 1 also includes two parasitic strip dipole elements 20 and 30 which are both aligned in parallel with driven dipole 10. The parasitic strip dipole elements are preferably copolanar with driven dipole element 10 and all three dipole elements lie in what is referred to herein as a dipole plane. Parasitic strip dipole elements 20 and 30 may also lie in a different plane from driven dipole element 10.

The dipole antenna system of this invention is also symmetrical in that both parasitic strip dipole elements are located the same predetermined distance from the driven dipole element. Preferably, that predetermined distance is much smaller than the wavelength of the center frequency of the excitation signals. In addition, the length of driven dipole 10 is preferably equal to approximately one-half the wavelength at that center frequency, and the length of each parasitic strip dipole 20 and 30 should be smaller than the length of driven dipole 10 e.g., less than 0.4 times the wavelength of that center frequency.

The dipole antenna element of this invention need not be constructed on a printed circuit, but in a preferred embodiment, the driven dipole element and the parasitic strip dipole elements are both copper printed circuit elements etched onto a printed circuit board. The advantages of such construction are ease and low cost of manufacture as well as the relatively light weight. In addition, by proper selection of the printed circuit board material, the dipole antenna element can be made flexible so that an array of such elements can easily conform to the surface of an airborne vehicle carrying the antenna array.

One dielectric material which has been found to be very effective for use as the printed circuit board material is Hexcel honeycomb material which is manufactured by Hexcel Corporation. The Hexcel honeycomb dielectric has an $E_r$ approximately equal to 1.02. The material is a type of epoxy fiberglass and is both durable and flexible. Persons of ordinary skill in the art will of course recognize that equivalent dielectric materials can be used instead.

Preferably, the dipole antenna of this invention includes a reflecting ground or image plane separated from and parallel to the dipole plane containing the driven and parasitic dipoles. One purpose of the ground plane is to ensure that the electric field generated by antenna system 1 is directed away from the ground plane. In the preferred embodiment, such a ground plane would also be a copper layer formed on a side of the printed circuit board opposite to the side containing the driven dipole and parasitic strip dipole elements. FIGS. 2A and 2B show such a ground plane 50.

In addition, the source of excitation signals is preferably formed on the side of the ground or image plane away from the driven and parasitic dipole elements. The excitation signal source, such as hybrid circuit 60, could also be formed on the ground plane itself if properly insulated.

In the preferred embodiment, driven dipole 10 is center-fed and connected to hydrid circuit 60 via a balanced feed lines which FIG. 2A shows as 50 ohm semirigid coaxial cables 70*a* and 70*b*. Other forms of connection are of course also possible.

In operation, the strip dipole elements 20 and 30 are excited parasitically by the longer dipole element 10 which is driven by excitation signals from hybrid cirucit 60. The dipole elements together form an electromagnetically coupled resonant circuit which produces broadband behavior characterized by good impedance match at two frequencies. The result is an expanded bandwidth as compared with that of a driven dipole element alone.

Impedance bandwidths greater than forty percent (40%) have been obtained with antenna systems of the present invention both in experiments and in numerical modeling. The best peformance has been obtained when the predetermined distance between the driven dipole element 10 and each parasitic strip dipole element 20 or 30 is relatively small as compared to the wavelength of the center frequency.

Another advantage of closely spacing parasitic strip dipoles and driven dipoles is that the antenna system may be used easily in an antenna array. For example, lattice spacings at an array of dipole antenna elements of this invention may be similar to the lattice spacings used in conventional dipole antenna arrays.

An analytical model of the dipole antenna system according to this invention was built and driven by an excitation signal having a center frequency $f_0=300$ MHz with a corresponding wavelength $\lambda=c/f_0$. The length of the driven dipole element 10 was set to 0.5λ, the length of each parasitic strip dipole element 20 and 30 was set to 0.276λ, the predetermined distance separating driven dipole 10 from both parasitic strip dipole elements 20 and 30 was set to 0.07λ, and the distance between the reflective ground plane 50 and the dipole plane containing the driven and parasitic strip dipole elements was set to 0.219λ. The ground or image plane was assumed to be perfectly conducting for the calculations, and the antenna pattern and driving point impedance were calculated using a method of moments numerical code.

Figure 3:
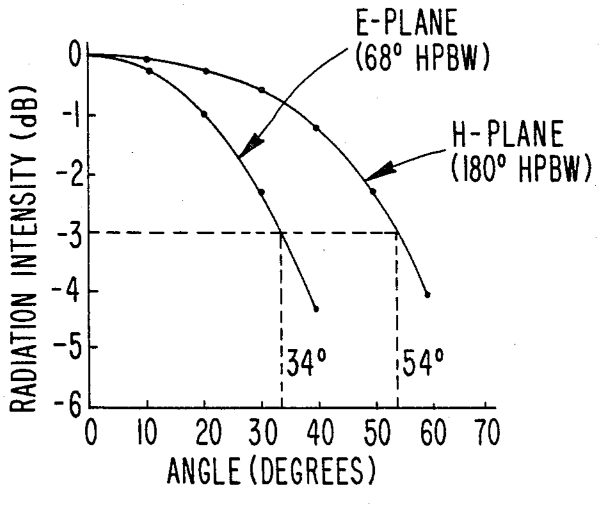
FIG. 3 shows a graph of the E-plane and H-plane radiation intensity for the embodiment of the invention shown in FIG. 1 with certain component values.
Figure 4:
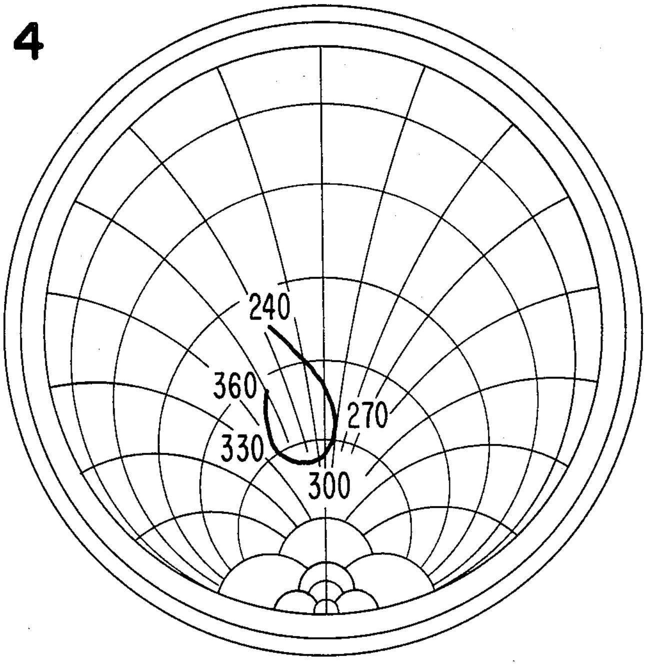
FIG. 4 is a Smith Chart corresponding to the graph in FIG. 3.

FIG. 3 is a graph showing the E-plane and H-plane radiation intensities for such an antenna system. FIG. 4 is a Smith Chart impedance plot which shows an approximately forty percent (40%) bandwidth centered around 100 ohms. Transformation to 50 ohms occurs through the hybrid used as a balun. The calculated half-power beamwidths are 68° in the E-plane and 180° degrees in the H-plane.

Figure 5:
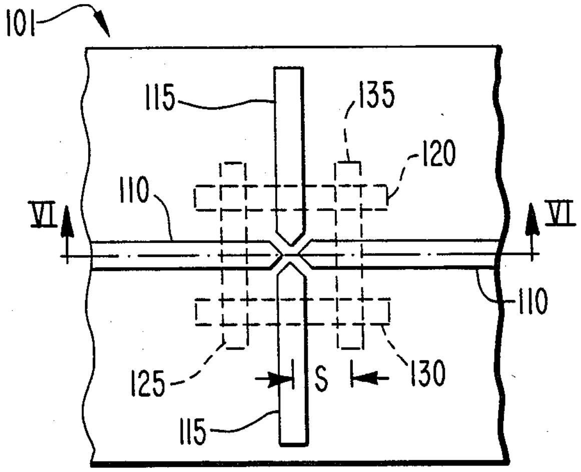
FIG. 5 shows a dipole antenna system according to this invention which provides dual orthogonal sense linear polarization.
Figure 6:
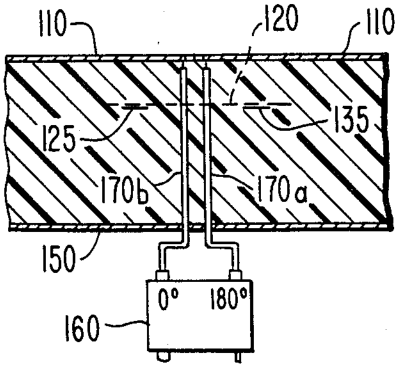
FIG. 6 shows a cross section of the dipole antenna system in FIG. 5 taken along line VI—VI.

The dipole antenna system of this invention can also be used to provide dual orthogonal sense lnear polarization configurations by adding a replica of the dipole antenna system shown in FIG. 1 and rotating that system 90°. FIG. 5 shows a top view of an embodiment of such antenna system 101 according to this invention. A lower level is shown by dotted lines. FIG. 6 shows a cross section of the dipole antenna system in FIG. 5 taken along line VI—VI.

In the dipole antenna system 101 in FIGS. 5 and 6, first and second driven dipole elements 110 and 115, respectively, are oriented orthogonal to each other. The driven dipoles 110 and 115 are also connected to a source of excitation signals, for example, hybrid circuit 160, and receive first and second excitation signals, respectively. The first and second excitation signals have first and second center frequencies, respectively. Preferably, the first and second excitation signals are the same and have the same center frequencies, but the excitation signals may be different.

In FIGS. 5 and 6, driven dipole elements 110 and 115 are also shown as lying in the same plane, which is preferred because of ease of printed circuit manufacturing. The driven dipole elements, however, may lie in different planes.

The antenna system of this invention as embodiment in FIGS. 5 and 6 also includes first and second pairs of parasitic strip dipole elements, 120/130 and 125/135, respectively. The first and second pairs of parasitic strip dipole elements are parallel to and electromagnetically coupled with the first and second driven dipole elements, respectively. Preferable, the first and second pairs of driven dipole elements are coplanar, also for ease of manufacturing, but these pairs of elements may lie in different planes.

In the preferred embodiment, the orthogonal linear polarization antenna system 101 shown in FIGS. 5 and 6 is manufactured on a double-layer printed circuit board with the driven dipole elements 110 and 115 on the top layer and parasitic strip dipole elements 120, 125, 130 and 135 on a second layer. A ground plane 150 is preferably on the bottom and hybrid 160, which provides a source of excitation signals, is connected to the driven dipole elements via pairs of balanced feedlines, two of which, **170*a* and 170*b*, are shown as connected to driven dipole elements 110. The other balanced feedlines connected to driven dipole element 115** are not shown in the cross section, but are similarly connected.

The constraints regarding the lengths of the dipole elements relative to the excitation signal center frequency wavelength and relative to each other which were discussed with regard to dipole antenna system 1 apply as well to dipole antenna system 101, and will not be repeated. In addition, the statements made regarding the printed circuit board materials used in constructing antenna system 1 apply as well to the construction of antenna system 101 and also will not be repeated.

Analytical and experimental models of the dual polarized antenna system of this invention have also been developed. In one system, both driven dipoles were excitated by the same signal whose center frequency was 2.8 GHz. The length of each driven dipole was 2.346 inches, the length of each parasitic strip dipole element was 1.173 inches, the width of the driven dipole elements was 0.15 inches, the distance from the ground plane to the plane containing the parasitic strip dipole elements was 0.79 inches and the distance from the ground plane to the plane containing the driven dipole elements was 0.98 inches. In addition, the predetermined distances between each driven dipole and the corresponding parasitic strip dipole elements were equal to each other and that distance, as measured from each parasitic dipole element to a projection of the corresponding driven dipole element on the plane containing the parasitic strip dipole elements, ("S" in FIG. 5) was 0.38 inches.

Figure 7A:
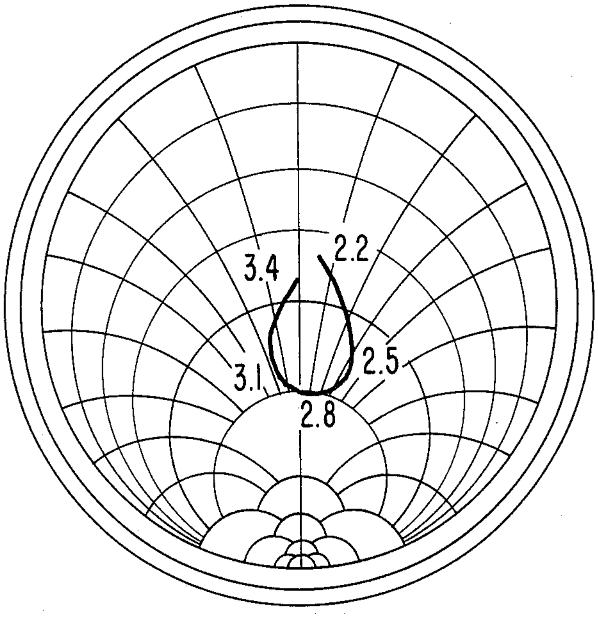
FIGS. 7A and 7B are Smith Charts for the calculated and measured input impedances, respectively, of the antenna system shown in FIG. 5 with certain component values.
Figure 7B:
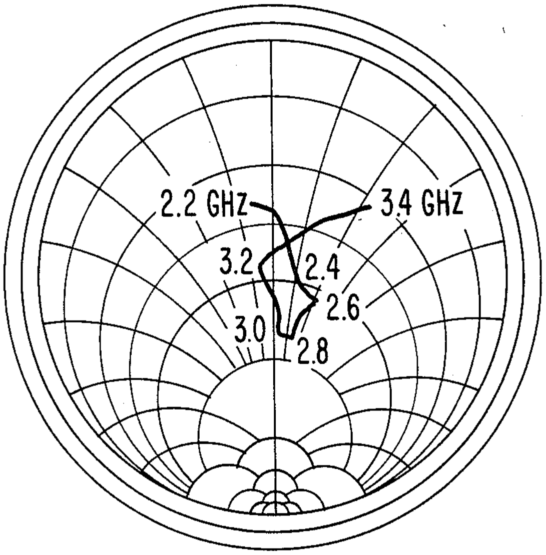

The calculated and measured impedances are shown in FIGS. 7A and 7B, respectively. These results confirm that the impedance bandwidth of the model exceeds forty percent (40%) for a VSWR of 2.0:1.

Figure 8:
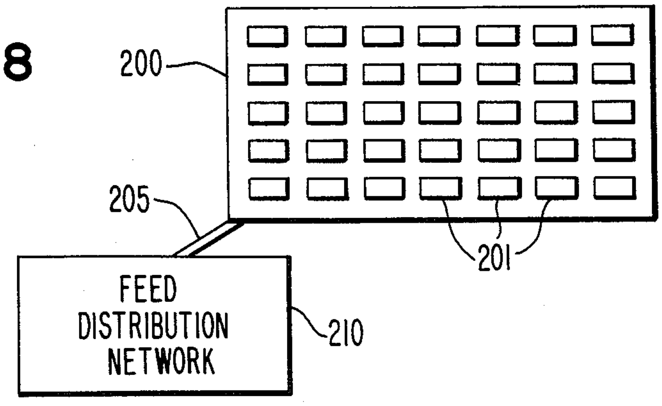
FIG. 8 is a diagram showing an array of antenna elements according to the present invention.

FIG. 8 shows an antenna array according to the present invention. In FIG. 8, antenna array 200 includes elements 201 which can each be the antenna elements shown in either FIG. 1 (and FIGS. 2A and 2B), FIG. 5 (and FIG. 6), or any other antenna element according to the present invention. Feed distribution network 210 supplies excitation signals to antenna elements 201 via feedlines 205. Antenna elements 201 are then connected to feedlines 205 and to each other in a maner which will achieve the necessary array function. Such connections are conventional, so are not described in detail.

Antenna array 200 could be a phased array transmitter or receiver, for example. In such a phased array, the construction of feed distribution network 210 would be conventional and would require one of ordinary skill to make only minor modifications to known feed distribution networks for conventional antenna elements. The advantage of an antenna array in accordance with the present ivention is that it could be built using printed circuit technology and could conform to the vehicle carrying it. In addition, such an aray would supply a large bandwidth for antenna array functions.

It will be apparent to those skilled in the art that modifications and variations can be made in the dipole antenna system of this invention. The invention, in its broader aspects, is not limited to the specific details, representative apparatus, and illustrative examples shown and described. Departure may be made from such details without departing from the spirit or scope of the general inventive concept.

What is claimed:

1. A dipole antenna system coupled to a source of excitation signals having a center frequency of wavelength $\lambda$, said dipole antenna system comprising:

a driven dipole element having a length of approximately $0.5\lambda$ electrically connected to said source of excitation signals;

two parasitic strip dipole elements each having a length of approximately $0.276\lambda$ aligned in parallel with said driven dipole element, said strip dipole elements each being located a predetermined distance of approximately $0.07\lambda$ from said driven dipole element, said driven dipole element and said parasitic dipole elements being substantially coplanar in a dipole plane; and a reflecting ground plane parallel to said driven and said parasitic strip dipole elements, and separated from said dipole plane by approximately $0.219\lambda$, whereby said parasitic strip dipole elements are electromagnetically coupled to said driven dipole element to expand the bandwidth of said dipole antenna system.

2. A dipole antenna system coupled to a source of first and second excitation signals having first and second center frequencies, respectively, said dipole antenna system comprising:

first and second driven dipole elements located orthogonal to each other and electrically connected to said source of excitation signals for receiving said first and second excitation signals, respectively;

first and second pairs of parasitic strip dipole elements, said first pair of parasitic dipole elements being aligned parallel to said first driven dipole element, each of said first pair of parasitic strip dipole elements being located at a first predetermined distance from said first driven dipole element, being smaller in length than said first driven dipole element, and having a length less than $0.4\lambda 1$ where $\lambda 1$ is the wavelength of the first center frequency, and said second pair of parasitic dipole elements being aligned parallel to said second driven dipole element, each of said second pair of parasitic strip dipole elements being located a second predetermined distance from said driven dipole element, being smaller in length than said first driven dipole element, and having a length less than $0.4\lambda 2$ where $\lambda 2$ is the wavelength of the second center frequency, whereby said first and second pairs of parasitic strip dipole elements are electromagnetically coupled to said first and second driven dipole elements to expand the bandwidths of said antenna system.

3. The dipole antenna system of claim 2 further including a reflecting ground plane separated from and parallel to said first and second driven and parasitic dipole elements.

4. The dipole antenna system of claim 2 wherein said first and second driven dipole elements are coplanar and lie in a driven dipole plane.

5. The dipole antenna system of claim 2 wherein said first and second parasitic strip dipole elements are coplanar and lie in a parasitic dipole plane.

6. The dipole antenna system of claim 3 wherein said first and second driven dipole elements are coplanar and lie in a driven dipole plane.

7. The dipole antenna system of claim 3 wherein said first and second parasitic strip dipole elements are coplanar and lie in a parasitic dipole plane.

8. The dipole antenna system of claim 7 wherein said first and second driven dipole elements are coplanar and lie in a driven dipole plane.

9. The dipole antenna system of claim 8 further including a dielectric printed circuit board containing said driven and parasitic dipole planes, wherein said driven and parasitic strip dipole elements are printed circuit elements on said printed circuit board, and wherein said reflecting ground plane is also formed on said printed circuit board and separated from each said plane by said dielectric printed circuit board.

10. The dipole antenna system of claim 9 wherein said printed circuit board is made from Hexcel material.

11. The dipole antenna system of claim 2 wherein said driven dipole elements are each connected to a hybrid circuit via balanced feed lines.

12. The dipole antenna system of claim 2 wherein said driven dipole elements are center-fed.

13. The dipole antenna system of claim 2 wherein said first predetermined distance is much smaller than the wavelength at said first center frequency and said second predetermined distance is much smaller than the wavelength at said second center frequency.

14. The dipole antenna system of claim 2 wherein the length of said first driven dipole elements is approximately one-half the wavelength of said first center frequency.

15. The dipole antenna system of claim 2 wherein the length of said second driven dipole element is approximately one half the wavelength of said second center frequency.

16. The dipole antenna system of claim 2 wherein the length of each of said pair of first parasitic strip dipole elements is less than the length of first driven dipole element and the length of each of said pair of second parasitic strip dipole elements is less than the length of said second driven dipole.

17. The dipole antenna system of claim 2 wherein said first and second excitation signals are the same.

18. An array of antenna elements coupled to a feed distribution network providing first and second excitation signals having first and second center frequencies, respectively, each of the dipole antennas comprising:

first and second driven dipole elements located orthogonal to each other and coupled to receive said first and second excitation signals, respectively;

first and second pairs of parasitic strip dipole elements, said first pair of parasitic dipole elements being aligned parallel to said first driven dipole element, each of said first pair of parasitic strip dipole elements being located at a first predetermined distance from said first driven dipole element, being smaller in length than said first driven dipole element, and having a length that is less than 0.4 times the wavelength of the first center frequency, and said second pair of parasitic dipole elements being aligned parallel to said second driven dipole element, each of said second pair of parasitic strip dipole elements being located a second predetermined distance from said second driven dipole element, being smaller in length than said second driven dipole element, and having a length that is less than 0.4 times the wavelength of the second center frequency, whereby said first and second pairs of parasitic strip elements of each said dipole antenna are electromagnetically to the corresponding one of said first and second driven dipole elements thereby to expand the bandwidth of said antenna array.

19. The antenna array of claim 18 further including a reflecting ground plane separated from and parallel to said first and second driven and parasitic dipole elements of each said dipole antenna.

20. The antenna array of claim 19 further including a dielectric printed circuit board, wherein said driven and parasitic strip dipole elements of each said dipole antenna or printed circuit elements on said printed circuit board, and wherein said reflecting ground plane is also formed on said printed circuit board.

* * * * *